3,210,337
6-(BENZOFURYLCARBOXAMIDO)- AND 6-(THIA-NAPHTHENYLCARBOXAMIDO) - PENICILLANIC ACID DERIVATIVES

Alfred W. Chow, Merchantville, N.J., and John R. E. Hoover, Glenside, Pa., assignors to Smith Kline & French Laboratories, Philadelphia, Pa., a corporation of Pennsylvania
No Drawing. Filed Sept. 21, 1962, Ser. No. 225,378
9 Claims. (Cl. 260—239.1)

This application is a continuation-in-part of our copending application Serial No. 97,749, filed March 23, 1961, now abandoned, which in turn is a continuation-in-part of Serial No. 62,333, filed October 13, 1960, now abandoned.

The invention described in this application pertains to novel compounds possessing valuable chemotherapeutic activity and more specifically to a new class of compounds demonstrating important antimicrobial properties.

More particularly the compounds of this invention demonstrate a high level of antimicrobial activity against such organisms as *Micrococcus pyogenes, Proteus vulgaris* and *Diplococcus pneumoniae*. In addition, these compounds show certain other properties such as prolonged stability, high serum titers and a low incidence of side effects.

Certain of these compounds, furthermore, demonstrate antimicrobial activity against certain microorganisms which have shown resistance to the known penicillins as for example certain penicillin resistant strains of *Staphylococcus aureus*.

Our compounds are accordingly useful in the treatment of various microbial infections, providing a safe and effective therapy with minimum, if any, associated side effects. The administration of these compounds to the infected host may be accomplished in any of the usual forms, such as for example, solutions, suspensions, creams, ointments, tablets, capsules, and the like, and are suitable for oral, injectable, or topical application, depending upon the nature of the particular infection.

The compounds of the present invention may be represented by the following structural formula:

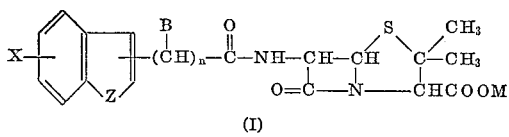

(I)

where M is hydrogen or a pharmaceutically acceptable nontoxic cation; B is hydrogen or methyl; X is hydrogen, halogeno, lower alkyl, lower alkoxy, or trifluoromethyl; Z is a Group VI atom of an atomic weight less than 33 such as oxygen or sulfur; and $n$ is an integer from 0 to 1 inclusively.

Embraced within the scope of the present invention are the nontoxic pharmaceutically acceptable salts of the above carboxyloic acid radical. The cations comprised in these salts and embraced by M include for example, the alkali metal ions as for instance the sodium ion, potassium ion, calcium ion as well as the organic amine cations, such as the lower alkyl ammonium groups, as for instance triethylammonium, procaine, dibenzylamine, 1-ephenamine, dehydroabiethylamine and the like.

The compounds of our invention are thus thianaphthenecarboxamido and benzofurancarboxamido acid derivatives of 6-aminopenicillanic acid and are prepared by treating a compound of the formula:

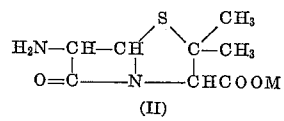

(II)

with a mixed anhydride or acid chloride of the appropriate thianaphthenecarboxylic acid or benzofurancarboxylic acid so as to form the desired carboxyamido compound. The requisite mixed anhydride is obtained, for example, by treating a thianaphthenecarboxylic acid or benzofurancarboxylic acid with a lower alkyl chloroformate as for example, ethyl chloroformate. These reactions may be represented as follows:

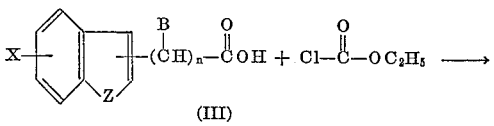

(III)

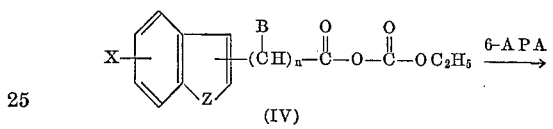

(IV)

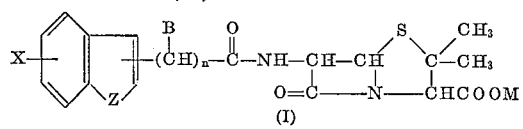

(I)

Alternatively the acid chloride of compound III may be employed to acylate 6-aminopenicillanic acid.

Several of the requisite thianaphthenecarboxylic acids and benzofurancarboxylic acids employed as starting materials are readily available. Those which are not can be prepared from the appropriate thianaphthene or benzofuran by methods analogous to those known in the art and described below.

The following examples will serve to further typify the nature of our invention; however these examples should not be construed as restricting the scope of this invention.

Example 1

To 1.8 l. of carbon disulfide are added 270 g. (2.02 moles) of anhydrous aluminum chloride. The suspension is cooled to 5° C. and a mixture of 210 g. (1.57 moles) of thianaphthene, 107 g. (1.36 moles) of acetyl chloride and 200 ml. of carbon disulfide are added in a dropwise fashion and at such a rate so as to maintain a temperature below 10°. Upon completion of the addition, the reaction mixture is allowed to stand for 2 hours and 10% hydrochloric acid is then added to decompose the reaction mixture. The layers which form are next separated. The aqueous layer is extracted three times with ether and these ethereal extracts then combined with the organic layer. This solution is dried over magnesium sulfate, the solvents removed in vacuo and the residue so obtained subjected to fractional distillation, obtaining 3-acetylthianaphthene at a boiling point of 135–137°/3 mm.

A solution of 34 g. (0.825 mole) of sodium hydroxide in 280 ml. of water is cooled to 0° C. and to the solution is added 48.0 (154 ml., 0.3 mole) of bromine in a dropwise fashion at such a rate so as to maintain a temperature below 10°. The solution is again cooled to 0° and 17.6 g. (0.1 mole) of 3-acetylthianaphthene is added dropwise, maintaining a temperature of 0°. Upon decolorization of the reaction mixture, stirring is continued for 3 hours. At the end of this time the reaction mixture is steam distilled to remove the bromoform and carbon tetrabromide. The residue is then cooled to 50° and acidified by the addition of 40 ml. of concentrated sulfuric acid. The solid which thus forms is collected by filtration, washed with water and recrystallized from hexane to yield thianaphthene-3-carboxylic acid.

*Example 2*

A solution of 12.3 g. (0.086 mole) of thianaphthene-3-carboxylic acid in 200 ml. of acetone is cooled in an ice bath to 0°. To the cooled solution is added 10.2 g. (0.1 mole) of triethylamine in 100 ml. of acetone. The temperature of the reaction mixture is maintained at —10° and a solution of 12.5 g. (0.11 mole) of ethylchloroformate in 45 ml. of acetone is added dropwise with agitation so as to maintain a final reaction temperature of —5°. To this mixture is then slowly added with stirring a solution of 23.8 g. (0.1 mole) of 6-aminopenicillanic acid in 40 ml. of water and 15 ml. of triethylamine. Upon completion of the addition, the mixture is stirred and allowed to attain room temperature and then stirred for an additional one-half hour. The mixture is extracted with three portions of 300 ml. of ether and the resulting aqueous solution adjusted to pH 2.0 with 6 N sulfuric acid, maintaining a temperature of less than 10°. At pH 2 the solution is extracted with 250 ml. of butyl acetate followed by two extractions of 75 ml. each of butyl acetate.

To the combined butyl acetate extracts are added 250 ml. of water and the pH adjusted to 8.0 by the addition of solid potassium bicarbonate with agitation. The layers are separated and the aqueous layer is adjusted to pH 2.0 by the addition of 6 N sulfuric acid at less than 10° C. This acidic aqueous mixture is next extracted with 200 ml. of butyl acetate and this organic extract then washed once with water and dried over sodium sulfate. To the butyl acetate solution is added with vigorous stirring a solution of potassium hydroxide in n-butanol (40 g./l.) until the pH of the reaction mixture is 8.4. The mixture is cooled until crystallization occurs. The crystals are then collected by centrifugation, washed with a small amount of acetone and dried. The dried crystals are recrystallized from butanol and dried to yield 6-[(3-thianaphthenyl)-carboxyamido]-penicillanic acid as the potassium salt.

Alternatively, 3.5 g. (0.02 mole) of thianaphthene-3-carboxylic acid is allowed to react with 11 ml. of thionyl chloride at room temperature overnight. The resulting solution is evaporated in vacuo at 35° C. and to the oil so obtained is added 25 ml. of benzene and the mixture then re-evaporated. After adding an additional 35 ml. of benzene and repeating the process, the residual oil is held under vacuum to remove any traces of thionyl chloride and 4 g. of the oil then dissolved in 50 ml. of dried acetone. This solution is added slowly with stirring to 4.3 g. of 6-aminopenicillanic acid in 190 ml. of 3% aqueous sodium bicarbonate and 120 ml. of acetone. The reaction mixture is maintained at 25° for 1½ hours, extracted twice with 150 ml. of ether and to the residual aqueous solution is added 40 ml. of butyl acetate. This mixture is cooled to below 10°, adjusted to pH 2.4 with 20% phosphoric acid and the phases separated. The aqueous phase is extracted with 15 ml. of butyl acetate and the combined butyl acetate extracts washed with 10 ml. of water adjusted to pH 3. The washed organic solution is then dried over magnesium sulfate, filtered and to the filtrate is added 9.6 ml. of 30% potassium 2-ethylhexanoate in isopropanol. One volume of ether is then added with stirring and the crystals which form upon cooling are collected by filtration, washed with 1:1 ether-butyl acetate, then ether and finally dried to yield 6-[(3-thianaphthenyl)-carboxyamido]-penicillanic acid as the potassium salt.

Treatment of potassium salt with hydrogen chloride and extraction with ether then yields the free acid 6-[(3-thianaphthenyl)-carboxyamido]-penicillanic acid.

*Example 3*

Equivalent amounts of the following substituted thianaphthenes are subjected to the procedure of Example 1: 4-bromothianaphthene, 7-bromothianaphthene, 5-chlorothianaphthene and 6-chlorothianaphthene.

The correspondingly substituted thianaphthenes 3-carboxylic acids so obtained are then subjected to the procedures of Example 2. There is thus obtained the following compounds: 6-[(4-bromo-3-thianaphthenyl)-carboxyamido]-penicillanic acid, 6-[(7-bromo-3-thianaphthenyl)-carboxyamido]-penicillanic acid, 6-[(5-chloro-3-thianaphthenyl)-carboxyamido]-penicillanic acid, and 6-[(6-chloro-3-thianaphthenyl)-carboxyamido] - penicillanic acid.

*Example 4*

In a similar fashion as described in Example 3, equivalent amounts of the following thianaphthenes are subjected to the procedures of Examples 1 and 2: 6 - methylthianaphthene, 5 - methoxythianaphthene, 5 - ethylthianaphthene, 5 - butylthianaphthene, and 5 - trifluoromethylthianaphthene. There are thus respectively obtained the following compounds: 6-[(6-methyl-3-thianaphthenyl)-carboxyamidol]-penicillanic acid, 6-[(5-methoxy-3-thianaphthenyl) - carboxyamido]-penicillanic acid, 6-[(5-ethyl-3-thianaphthenyl)-carboxyamido]-penicillanic acid, 6-[(5-butyl-3 - thianaphthenyl) - carboxyamido] - penicillanic acid, and 6 - [(5-trifluoromethyl-3-thianaphthenyl)-carboxyamido]-penicillanic acid.

*Example 5*

To a boiling solution of 152.5 g. (1 mole) of 2-chlorobenzaldehyde in 700 ml. of ethanol is added in a dropwise fashion with stirring a fused mixture of 120 g. of sodium sulfide and 16 g. of sulfur over a 2 hour period. The mixture is then cooled and combined with a solution of 60 g. of potassium hydroxide and 60 g. of sodium sulfide in 300 ml. of water. The mixture is heated for 15 minutes and brought to a boil. To this mixture is then added with stirring a solution of 140 g. of chloroacetic acid in 250 ml. of water which has been neutralized by the addition of sodium bicarbonate. The mixture is allowed to stand for 15 hours at the end of which time a crystalline mass forms. This solid is collected by filtration and dissolved in dilute aqueous sodium hydroxide solution. Upon acidification a solid forms which is collected by filtration, dried and recrystallized from hexane to yield thianaphthene-2-carboxylic acid. This compound is then substituted for thianaphthene-3-carboxylic acid in the procedure of Example 2 and there is thus obtained 6-[(2 - thianaphthenyl) - carboxyamido]-penicillanic acid.

In a similar fashion, equivalent amounts of the following substituted benzaldehyde are employed in place of 2-chloro-4-methylbenzaldehyde, 2-chloro-4-methoxybenzaldehyde and 2-chloro-4-ethoxybenzaldehyde. There are thus respectively obtained the compounds 6-methylthianaphthene-2-carboxylic acid, 6-methoxythianaphthene-2-carboxylic acid and 6-ethoxythianaphthene-2-carboxylic acid. Upon substitution of equivalent amounts of these compounds in the procedure of Example 2, there is thus obtained respectively the compounds 6-[(6-methyl-2-thianaphthenyl)-carboxyamido]-penicillanic acid, 6-[(6-methoxy-2-thianaphthenyl) - carboxyamidol]-penicillanic acid and 6-[(6-ethoxy-2-thianaphthenyl)-carboxyamido]-pencillanic acid.

*Example 6*

A chilled solution of 29.5 g. (0.217 mole) of N-butylbromide in 40 ml. of anhydrous ether is added in a dropwise fashion to a chilled suspension of 3.6 g. (0.535 mole) of finely cut lithium wire in 70 ml. of anhydrous ether. The reaction mixture is cooled in an ice bath during the addition and upon completion of the addition, is refluxed for 1 hour with stirring. The reaction mixture is then filtered and cooled in an ice bath. There are next added 19.3 g. (0.144 mole) of thianaphthene in 30 ml. of anhydrous ether. Upon completion of the addition, the mixture is refluxed for 45 minutes.

To this etheral solution of thianaphthene lithium are slowly added 225 g. (5.0 moles) of acetaldehyde in 500 ml. of chilled anhydrous ether. The mixture is heated at reflux temperature for 1 hour and at the end of this time, poured into 5 l. of ice water which has been saturated with ammonium chloride. The organic layer is then separated and the aqueous layer extracted three times with ether. The combined organic layers are dried over sodium carbonate and distilled in vacuo to yield 1-(2-thianaphthenyl)-ethanol.

A mixture of 35.6 g. (0.20 mole) of 1-(2-thianaphthenyl)-ethanol and 29.7 g. (0.25 mole) of thionyl chloride are refluxed for 1½ hours. The mixture is then distilled and recrystallized from hexane to yield 2-(α-chloroethyl)-thianaphthene.

A mixture of 14.9 g. (0.076 mole) of 2-(α-chloroethyl)-thianaphthene, 7.8 g. (0.12 mole) of potassium cyanide, 125 ml. of dioxane and 65 ml. of water is stirred at reflux for 3 hours. The mixture is then cooled, additional water is added and the organic layer separated. The aqueous layer is then extracted 3 times with benzene and these benzene extracts are then combined with the organic layer. The combined organic solutions are then washed, dried and the solvents are then removed under reduced pressure and the residue distilled in vacuo to yield 2-(α-cyanoethyl)-thianaphthene.

A mixture of 14.9 g. (0.08 mole) of 2-(α-cyanoethyl)-thianaphthene, 10 g. of sodium hydroxide (0.25 mole), 50 ml. of water and 50 ml. of ethanol is refluxed for 18 hours. The mixture is then cooled and approximately 17 ml. of concentrated hydrochloric acid is slowly added until the mixture is only weakly basic. The mixture is then filtered and the filtrate boiled to remove excess ethanol. Water is then added and the aqueous basic solution washed with ether. The washed solution is next clarified with charcoal, filtered, and the filtrate acidified. The solid which thus forms is collected by filtration, dried and recrystallized from carbontetrachloride to yield α-(2-thianaphthenyl)-propionic acid.

α-(2-thianaphthenyl)-propionic acid is then subjected to the reaction procedure of Example 2. Upon completion of the steps therein described, there is thus obtained the compound 6-[α-(2-thianaphthenyl)-propionamido]-penicillanic acid.

*Example 7*

In a similar fashion by employing formaldehyde in place of acetaldehyde in the initial steps of the procedure of Example 6, there is obtained upon completion 2-thianaphthenylmethanol which when subjected to the remaining steps of the procedure of Example 6, yields 6-[(2-thianaphthenyl)-acetamido]-penicillanic acid.

*Example 8*

By employing the substituted thianaphthenes recited in Examples 3 and 4 in the procedure of Example 6, there are thus obtained the following compounds:

6-[α-(4-bromo-2-thianaphthenyl)-propionamido]-penicillanic acid,
6-[α-(5-chloro-2-thianaphthenyl)-propionamido]-penicillanic acid,
6-[α-6-chloro-2-thianaphthenyl)-propionamido]-penicillanic acid,
6-[α-(7-bromo-2-thianaphthenyl)-propionamido]-penicillanic acid,
6-[α-(6-methyl-2-thianaphthenyl)-propionamido]-penicillanic acid,
6-[α-(5-methoxy-2-thianaphthenyl)-propionamido]-penicillanic acid,
6-[α-(5-ethyl-2-thianaphthenyl)-propionamido]-penicillanic acid,
6-[α-(5-butyl-2-thianaphthenyl)-propionamido]-penicillanic acid, and
6-[α-(5-trifluoromethyl-2-thianaphthenyl)-propionamido]-penicillanic acid.

In a similar fashion by employing these substituted thianaphthenes in the procedure of Example 7 wherein formaldehyde is used in place of acetaldehyde, there are obtained the following compounds:

6-[(4-bromo-2-thianaphthenyl)-acetamido]-penicillanic acid,
6-[(5-chloro-2-thianaphthenyl)acetamido]-penicillanic acid,
6-[(6-chloro-2-thianaphthenyl)-acetamido]-penicillanic acid,
6-[(7-bromo-2-thianaphthenyl)-acetamido]-penicillanic acid,
6-[(6-methyl-2-thianaphthenyl)-acetamido]-penicillanic acid,
6-[(5-methoxy-2-thianaphthenyl)-acetamido]-penicillanic acid,
6-[(5-ethyl-2-thianaphthenyl)-acetamido]-penicillanic acid,
6-[(5-butyl-2-thianaphthenyl)-acetamido]-penicillanic acid,
6-[(5-trifluoromethyl-2-thianaphthenyl)-acetamido]-penicillanic acid.

*Example 9*

A stream of hydrogen chloride is passed through a solution of 372 g. (4.6 moles) of 37% aqueous formaldehyde, 153 ml. (4.2 moles) of concentrated hydrochloric acid and 500 g. of thianaphthene until the solution is saturated with hydrogen chloride. During this time the temperature rises to approximately 85° C. and is maintained at this level for 1 hour while the slow bubbling of hydrogen chloride is continued. At the end of this time, the mixture is cooled and poured into 350 ml. of ice water. The mixture is then extracted with benzene and the benzene extracts washed with water, 10% aqueous sodium bicarbonate solution and finally with water again. This washed benzene solution is next dried and the solvents removed under reduced pressure. The residue is distilled in vacuo to yield 3-chloromethylthianaphthene.

By substituting an equivalent amount of acetaldehyde for formaldehyde in the foregoing procedure, there is obtained the compound 3-(α-chloroethyl)-thianaphthene.

3-chloromethylthianaphthene (13.9 g., 0.076 mole) is combined with 7.8 g. (0.12 mole) of potassium cyanide, 125 ml. of dioxane and 65 ml. of water. This mixture is stirred at reflux for 3 hours and at the end of this time is cooled. The organic layer is separated and the aqueous layer extracted three times with benzene. These benzene extracts are then combined with the organic layer and the combined organic solution then washed with water, dried and the solvents removed under reduced pressure. The residue is distilled in vacuo to yield 3-cyanomethylthianaphthene.

A mixture of 13.7 g. (0.08 mole) of 3-cyanomethylthianaphthene, 10 g. of sodium hydroxide (0.25 mole), 50 ml. of water and 50 ml. of ethanol are refluxed for 18 hours. The mixture is then cooled and approximately 17 ml. of concentrated hydrochloric acid is slowly added until the mixture is only weakly basic. The mixture is then filtered and the filtrate boiled to remove excess ethanol. Water is then added to the aqueous basic solution and this dilute solution then washed with ether and clarified with charcoal. After filtering, the filtrate is acidified and the solid which thus forms again collected by filtration, dried and recrystallized from carbon tetrachloride to yield (3-thianaphthenyl)-acetic acid.

By subjecting 3-(α-chloroethyl)-thianaphthene prepared as above, there is obtained according to this procedure the compound α-(3-thianaphthenyl)-propionic acid.

Upon subjecting equivalent amounts of α-(3-thianaphthenyl)-propionic acid and (3-thianaphthenyl)-acetic acid to the procedure described in Example 2, there are respectively obtained the compounds 6-[α-(3-thianaphthenyl)-propionamido]-penicillanic acid and 6-[(3-thianaphthenyl)-acetamido]-penicillanic acid.

*Example 10*

A. To 500 ml. of anhydrous ether are added 18.6 g. (0.49 mole) of lithium aluminum hydroxide. The mixture is stirred, flushed with nitrogen and to it is added in a dropwise fashion so as to produce a gentle reflux, 48.6 g. (0.31 mole) of benzofuran 3-carboxylic acid. The mixture is then stirred for an additional 1½ hours at room temperature and the excess lithium aluminum hydroxide decomposed by the careful sequential addition of 19 ml. of water, 57 ml. of 10% aqueous sodium hydroxide and finally 57 ml. of water. The resultant mixture is filtered and the solid so obtained mixed with additional water, stirred and again filtered. The filtrates are combined and the layers separated. The aqueous layer is then extracted with ether and the combined organic layer dried over magnesium sulfate and concentrated to an oil under reduced pressure. This oil is then distilled in vacuo to yield 3-hydroxymethylbenzofuran.

To 88.1 g. (0.74 mole) of thionyl chloride is slowly added 45 g. of 3-hydroxymethylbenzofuran with cooling. Upon completion of the addition, the mixture is refluxed at steam bath temperatures for 1½ hours and the excess thionyl chloride removed under reduced pressure. The residue is flushed twice with dried benzene and the solvents removed after each addition under reduced pressure. The residue so obtained is then distilled in vacuo to yield 3-chloromethylbenzofuran.

To 40 ml. of dimethylformamide are added 34.3 g. (0.22 mole) of 3-chloromethylbenzofuran. To this solution is added 20 g. (0.41 mole) of sodium cyanide in 40 ml. of dimethylformamide. The solution is cooled in a water bath until heat is no longer generated. The mixture is then stirred for 15 minutes at room temperature and finally heated at 60° for 2 hours. The mixture is next cooled and filtered and the filtrate concentrated in vacuo. This residue is then distilled to yield 3-cyanomethylbenzofuran.

Two grams of 3-cyanomethylbenzofuran are dissolved in 30 ml. of #30 alcohol. To this solution is then added a solution of 0.6 g. (0.015 mole) of sodium hydroxide in 10 ml. of water. The mixture is gently refluxed for 18 hours, cooled, adjusted to pH 9.3 with concentrated hydrochloric acid and filtered. The filtrate is evaporated to remove the solvents and the residual solution diluted with water to approximately 50 ml. and extracted with two 50 ml. portions of ether. The residual aqueous phase is then decolorized with 0.25 g. of Norite and filtered. Adjustment of the filtrate to pH 2.9 with concentrated hydrochloric acid forms a solid which is collected by filtration and dried to yield (3-benzofuryl)-acetic acid.

B. To 150 g. of carbon disulfide is added 39.2 g. (0.47 mole) of benzofuran. The mixture is stirred vigorously with cooling and to it is added in a dropwise fashion 75 g. (0.47 mole) of bromine in 150 g. of carbon disulfide. The rate of addition is adjusted so that the temperature does not exceed −5° C. Upon completion of the addition, the solution is filtered and the solid so collected recrystallized from chloroform to yield benzofuranbromide.

A total of 27.8 g. (0.1 mole) of benzofurandibromide is added in several portions to a cooled solution of 12 g. of potassium hydroxide in absolute ethanol. Upon completion of the addition, the mixture is allowed to attain room temperature and is then refluxed with stirring for 2 hours. At the end of this time the mixture is steam distilled and the organic layer is separated from the distillate. This layer is washed once with water and dried over sodium sulfate to yield 3-bromobenzofuran.

A mixture of 19.9 g. (0.1 mole) of 3-bromobenzofuran, 9.8 g. (0.11 mole) of cuprous cyanide and 20 ml. of pyridine is heated for 18 hours at 215–240° C. The reaction mixture is then treated with aqueous ammonium hydroxide and extracted with benzene. The benzene extracts are then evaporated to a residue at steam bath temperature and the residue recrystallized from cyclohexane to yield 3-cyanobenzofuran, M.P. 93°.

To a solution of 25.0 g. of methyl magnesium iodide in anhydrous ether is added 14.5 g. (0.1 mole) of 3-cyanobenzofuran in a dropwise fashion. During the addition, the reaction is controlled as required by cooling. Upon completion of the addition, the mixture is refluxed for 1 hour. The solution is then cooled and an aqueous ammonium chloride solution is added. The reaction mixture is next extracted with ether and the ethereal extracts washed with 10% sulfuric acid and thence with water, after which they are dried over magnesium sulfate. The solvents are evaporated and the residual material distilled to yield 3-benzofurylmethyl ketone.

A solution of 16.2 g. (0.1 mole) of 3-benzofurylmethyl ketone in 20 ml. of anhydrous ether is added dropwise to a suspension of 1.9 g. (0.05 mole) of lithium aluminum hydride in 50 ml. of anhydrous ether. The mixture is then heated at reflux for 30 minutes. There is next cautiously added 2 ml. of water to decompose the reaction mixture and the resultant mixture is filtered. The filtrate is extracted with ether and the ethereal extracts thus obtained dried over magnesium sulfate. Evaporation of the dried ethereal solution and distillation of the residue then yields 3-(α-hydroxyethyl)-benzofuran.

3-(α-hydroxyethyl)-benzofuran is treated with thionyl chloride, sodium cyanide, and aqueous sodium hydroxide according to the procedure of Example 10A to yield sequentially the compounds 3-(α-chloroethyl)-benzofuran, 3-(α-cyanoethyl)-benzofuran and α-(3-benzofuryl)-propionic acid.

In a similar fashion by employing 5-chlorobenzofuran in the procedure of this example and upon execution of the steps herein described, there is ultimately obtained the compound α-(5-chloro-3-benzofuryl)-propionic acid. Similarly, 6-methylbenzofuran and 5-methoxybenzofuran when treated in the manner of this example yield the compounds α-(6-methyl-3-benzofuryl)-propionic acid and α-(5-methoxy-3-benzofuryl)-propionic acid.

C. One mole of salicylaldehyde (122 g.) is dissolved in 400 ml. of ethanol and refluxed with 56 g. of potassium hydroxide until a solution is obtained. There is then slowly added with stirring 92.5 g. (1 mole) of chloroacetone. When the reaction has subsided, an equal volume of water is added and the resultant mixture distilled to remove excess ethanol. The residual material is extracted with ether and the ethereal solutions dried over magnesium sulfate. Removal of the solvents under reduced pressure to yield a residue and recrystallization of this residue from ethanol yields 2-acetylbenzofuran.

To a suspension of 19 g. (0.5 mole) of lithium aluminum hydride in 500 ml. of anhydrous ether is added in a dropwise fashion, 160 g. (1 mole) of 2-benzofurylmethyl ketone in 200 ml. of anhydrous ether. This mixture is refluxed for 1 hour and then decomposed by the dropwise sequential addition of 17 ml. of water, 17 ml. of 10% aqueous sodium hydroxide and 57 ml. of water. The precipitated salts are removed from the solution by filtration and the filtrate concentrated to an oil which upon distillation in vacuo affords 2-(α-hydroxyethyl)-benzofuran.

In an analogous fashion to that described in Example 10A, 2-(α-hydroxyethyl)-benzofuran is subjected to chlorination, cyanotization and hydrolysis, employing equivalent amounts of the benzofuran compounds throughout. Upon execution of these steps, there is thus obtained the compound α-(2-benzofuryl)-propionic acid.

In a similar fashion by employing 5-bromosalicylaldehyde, 4-fluorosalicylaldehyde, 5-methylsalicylaldehyde and 4-methoxysalicylaldehyde, in the procedure of the present example, there are obtained the compounds α-(5-bromo-2-benzofuryl)-propionic acid, α-(4-fluoro -2- benzofuryl)-propionic acid, α-(5-methyl-2-benzofuryl)-propionic acid and α-(6-methoxy-2-benzofuryl)-propionic acid.

*Example 11*

A solution of 15.2 g. (0.086 mole) of 2-benzofuryl acetic acid in 200 ml. of acetone is cooled in an ice bath to 0°. To the cooled solution is added 10.2 g. (0.1 mole) of triethylamine in 100 ml. of acetone. The temperature of the reaction mixture is maintained at −10° and a solution of 12.5 g. (0.11 mole) of ethylchloroformate in 45 ml. of acetone is added dropwise with agitation so as to maintain a final reaction temperature of −5°. To this mixture is then slowly added with stirring a solution of 23.8 g. (0.1 mole) of 6-aminopenicillanic acid in 40 ml. of water and 15 ml. of triethylamine. Upon completion of the addition, the mixture is stirred and allowed to attain room temperature and then stirred for an additional one-half hour. The mixture is extracted with three portions of 300 ml. of ether and the resulting aqueous solution adjusted to pH 2.0 with 6 N sulfuric acid, maintaining a temperature of less than 10°. At pH 2 the solution is extracted with 250 ml. of butyl acetate followed by two extractions of 74 ml. each of butyl acetate.

To the combined butyl acetate extracts are added 250 ml. of water and the pH adjusted to 8.0 by the addition of solid potassium bicarbonate with agitation. The layers are separated and the aqueous layer is adjusted to pH 2.0 by the addition of 6 N sulfuric acid at less than 10° C. This acidic aqueous mixture is next extracted with 200 ml. of butyl acetate and this organic extract then washed once with water and dried over sodium sulfate. To the butyl acetate solution is added with vigorous stirring a solution of potassium hydroxide in n-butanol (40 g./l.) until the pH of the reaction mixture is 8.4. The mixture is cooled until crystallization occurs. The crystals are then collected by centrifugation, washed with a small amount of acetone and dried. The dried crystals are recrystallized from butanol and dried to yield 6-[(2-benzofuryl)-acetamido]-penicillanic acid as the sodium salt.

Similarly by employing 16.3 g. of α-(2-benzofuryl)-propionic acid in place of 2-benzofuryl acetic acid in the procedure of this example, there is obtained the compound 6 - [α-(2-benzofuryl)-propionamido]-penicillanic acid. Likewise by employing α-(5-bromo-2-benzofuryl)-propionic acid, α-(5-fluoro-2-benzofuryl)-propionic acid, α - (5 - methyl-2-benzofuryl)-propionic acid and α-(6-methoxy-2-benzofuryl)-propionic acid there are obtained the compounds 6 - [α-(5-bromo-2-benzofuryl)-propionamido]-penicillanic acid, 6 - [α - (5-fluoro-2-benzofuryl)-propionamido]-penicillanic acid, 6-[α-(5-methyl-2-benzofuryl) - propionamido] - penicillanic acid, and 6-[α-(6-methoxy-2-benzofuryl)-propionamido]-penicillanic acid.

*Example 12*

Eleven milliliters of thionyl chloride are combined with 3.52 g. (0.02 mole) of 3-benzofuryl acetic acid and the mixture allowed to stand at room temperature overnight. The resulting solution is evaporated in vacuo at 35° C. and to the oil so obtained is added 25 ml. of benzene and the mixture then re-evaporated. After adding an additional 25 ml. of benzene and repeating the process, the residual oil is held under vacuum to remove any traces of thionyl chloride. Four grams of the oil thus obtained are then dissolved in 50 ml. of dried acetone and this solution is slowly added with stirring to 4.3 g. of 6-aminopenicillanic acid in 190 ml. of 3% aqueous sodium bicarbonate and 120 ml. of acetone. The reaction mixture is maintained at 25° for 1½ hours, extracted twice with 150 ml. of ether and to the residual aqueous solution is added 40 ml. of butyl acetate. This mixture is cooled below 10°, adjusted to pH 2.4 with 20% phosphoric acid and the phases separated. The aqueous phase is extracted with 15 ml. of butyl acetate and the combined butyl acetate extracts washed with 10 ml. of water and adjusted to pH 3. The washed organic solution is then dried over magnesium sulfate, filtered and to the filtrate is added 9.6 ml. of 30% potassium 2-ethylhexanoate in isopropanol. One volume of ether is then added with stirring and the cystals which form upon cooling are collected by filtration, washed with 1:1 ether-butyl acetate followed by washing with ether and finally dried to yield 6-[3-(benzofuryl)-acetamido]-penicillanic acid as the potassium salt.

Treatment of an aqueous solution of this potassium salt with hydrogen chloride and extracted with ether then yields the free acid 6-[(3-benzofuryl)-acetamido]-penicillanic acid.

In a similar fashion 3.24 g. of benzofuran 3-carboxylic acid and 3.8 g. of α-(3-benzofuryl)-propionic acid are employed in the procedure of this example and there are thus respectively obtained upon completion of the steps herein described the compounds 6-[(3-benzofuryl)-carboxyamido]-penicillanic acid and 6-[α-(3-benzofuryl)-propionamido]-penicillanic acid.

Likewise, α - (6-methyl-3-benzofuryl)-propionic acid and α-(5-methoxy-3-benzofuryl)-propionic acid are employed in equivalent amounts in the procedure of the instant example. Upon execution of the steps described herein, there are respectively obtained the compounds, 6-[α - (6-methyl-3-benzofuryl)-propionamido]-penicillanic acid and 6-[α-(5-methoxy-3-benzofuryl)-propionamido]-penicillanic acid.

*Example 13*

One gram of 6-(2-thianaphthenylcarboxyamido)-penicillanic acid is dissolved in excess amyl acetate and to the solution is added 10 g. of N-ethylpiperidine. The solution is stirred for 30 minutes and the crystals formed upon standing are collected by filtration and dried to yield the N-ethylpiperidine salt of 6-(2-thianaphthenylcarboxyamido)-penicillanic acid.

*Example 14*

Triethylamine is substituted for N-ethylpiperidine in the procedure of Example 13 and 6-[α-(3-thianaphthenyl)-propionamido]-penicillanic acid is in turn substituted for 6-(2-thianaphthenylcarboxyamido)-penicillanic acid. There is thus obtained upon the execution of the steps therein described the triethylamine salt of 6-[α-(3-thianaphthenyl)-propionamido]-penicillanic acid.

We claim:

1. Compounds of the formula:

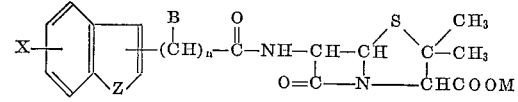

wherein

M is a cation selected from the group consisting of hydrogen, sodium, potassium, calcium and pharmaceutically acceptable nontoxic organic amine cations;

B is a member selected from the group consisting of hydrogen and methyl;

Z is a member selected from the group consisting of oxygen and sulfur;

X is a member selected from the group consisting of hydrogen, halogeno, lower alkyl, lower alkoxy, and trifluoromethyl; and n is an integer from 0 to 1 inclusively.

2. Compounds of the formula:

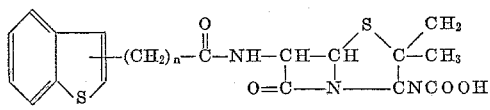

wherein *n* is an integer from 0 to 1.

3. Compounds of the formula:

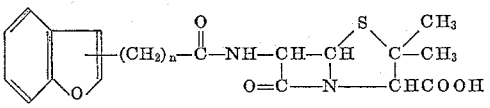

wherein *n* is an integer from 0 to 1 inclusively.

4. Compounds of the formula:

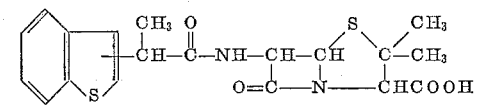

5. Compounds of the formula:

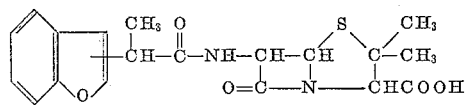

6. 6-[(2 - thianaphthenyl)-carboxyamido]-penicillanic acid.
7. 6-[(2-benzofuryl)-carboxyamido]-penicillanic acid.
8. 6-[(3 - thianaphthenyl)-carboxyamido]-penicillanic acid.
9. 6-[(3-benzofuryl)-carboxyamido]-penicillanic acid.

References Cited by the Examiner

Morton: The Chemistry of Heterocyclic Compounds, page VI of the preface (1946).

NICHOLAS S. RIZZO, *Primary Examiner.*